Dec. 4, 1945.　　　　C. R. DOTY　　　　2,390,486
RECORD PUNCHING MACHINE
Filed Feb. 15, 1945　　　13 Sheets-Sheet 1

Charles R. Doty INVENTOR
BY
ATTORNEY

Dec. 4, 1945.  C. R. DOTY  2,390,486
RECORD PUNCHING MACHINE
Filed Feb. 15, 1945  13 Sheets-Sheet 2
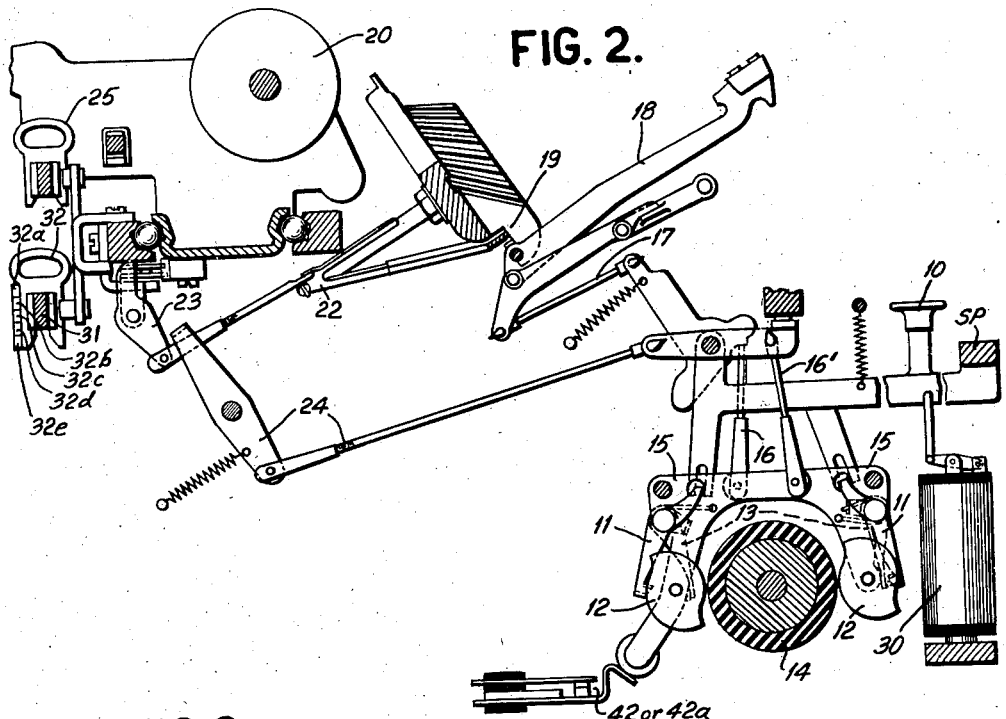
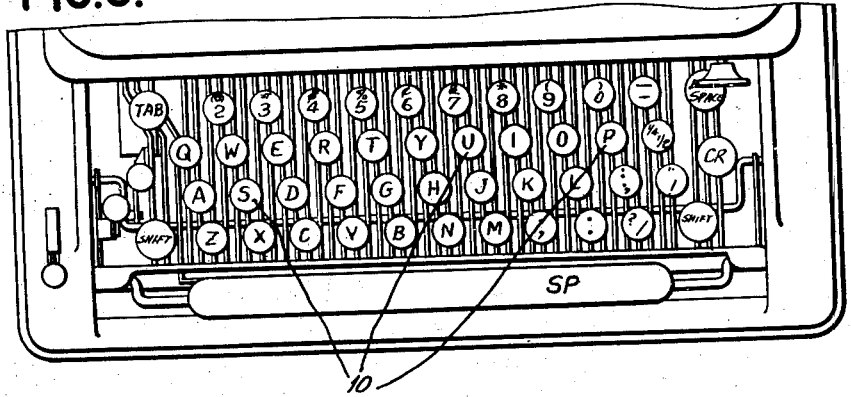
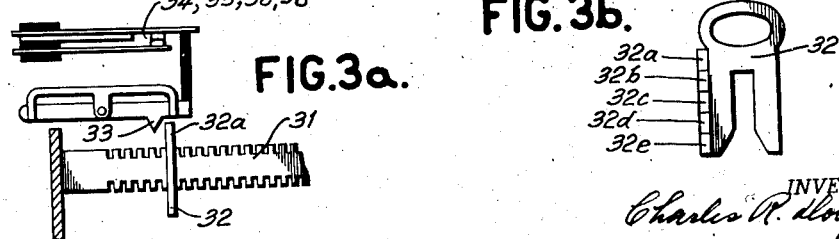

Dec. 4, 1945.   C. R. DOTY   2,390,486
RECORD PUNCHING MACHINE
Filed Feb. 15, 1945   13 Sheets-Sheet 3

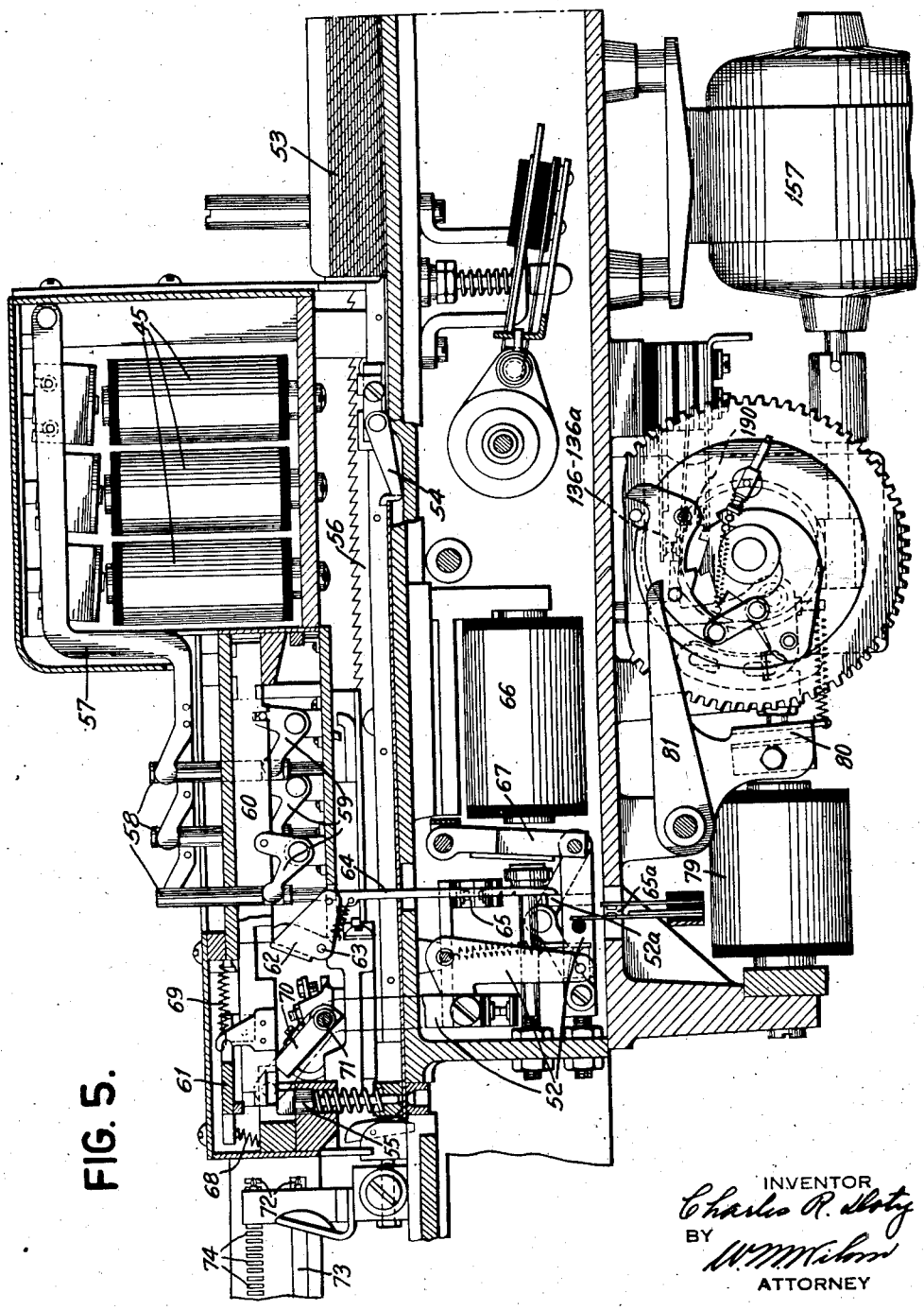

Dec. 4, 1945.  C. R. DOTY  2,390,486
RECORD PUNCHING MACHINE
Filed Feb. 15, 1945  13 Sheets-Sheet 7

INVENTOR.
Charles R. Doty
BY
ATTORNEY

Dec. 4, 1945.　　　　　C. R. DOTY　　　　　2,390,486
RECORD PUNCHING MACHINE
Filed Feb. 15, 1945　　　13 Sheets-Sheet 8

FIG. 7.

Dec. 4, 1945.  C. R. DOTY  2,390,486
RECORD PUNCHING MACHINE
Filed Feb. 15, 1945  13 Sheets-Sheet 9

FIG. 8.

CARD 1

INVENTOR.
Charles R. Doty
BY
W. M. Wilson
ATTORNEY

Dec. 4, 1945.  C. R. DOTY  2,390,486
RECORD PUNCHING MACHINE
Filed Feb. 15, 1945  13 Sheets-Sheet 10

FIG. 9.

INVENTOR.
Charles R. Doty
BY
ATTORNEY

Dec. 4, 1945.                C. R. DOTY                2,390,486
                        RECORD PUNCHING MACHINE
                         Filed Feb. 15, 1945        13 Sheets-Sheet 11

FIG. 10.

CARD 2

CARRIAGE RETURN
AK START PRINTING
TABULATE
ZERO SUPPRESSION
TABULATE
AK STOP PRINTING
ZERO SUPPRESSION
ZERO SUPPRESSION
AUTOMATIC SPACE
ZERO SUPPRESSION
AK START PRINTING
IK START PUNCHING
AK STOP PRINTING

INVENTOR.
Charles R. Doty
BY
                ATTORNEY

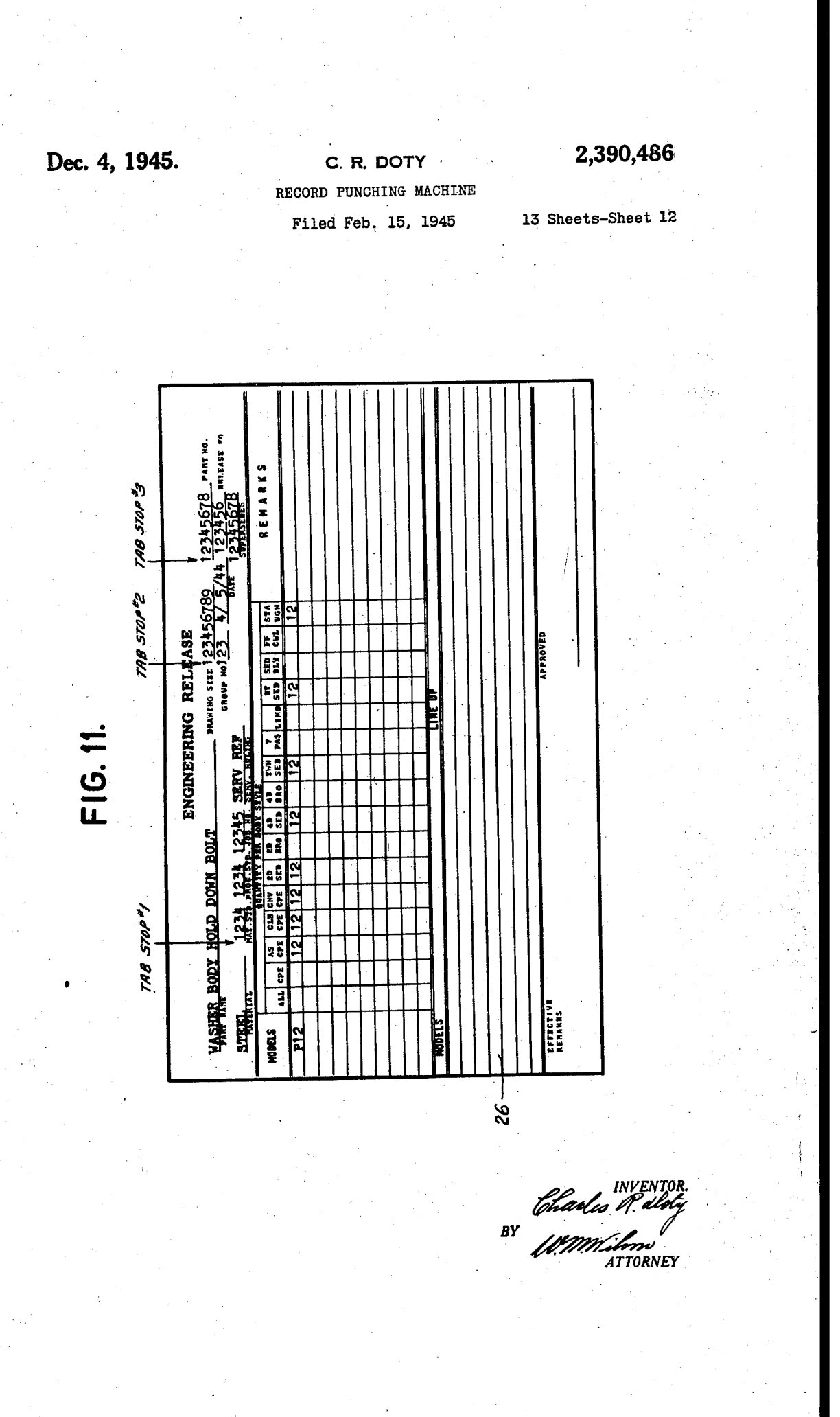

Dec. 4, 1945.   C. R. DOTY   2,390,486
RECORD PUNCHING MACHINE
Filed Feb. 15, 1945   13 Sheets-Sheet 12

FIG. 11.

INVENTOR.
Charles R. Doty
BY
ATTORNEY

Dec. 4, 1945.                C. R. DOTY                2,390,486
                        RECORD PUNCHING MACHINE
                   Filed Feb. 15, 1945      13 Sheets-Sheet 13

FIG. 12.

CARD 3

CARRIAGE RETURN
AUTOMATIC SPACE ZERO SUPPRESSION
ZERO SUPPRESSION
AK START PRINTING
TK START PUNCHING
AK STOP PRINTING

INVENTOR.
Charles R. Doty
BY
W. M. Wilson
ATTORNEY

Patented Dec. 4, 1945

2,390,486

UNITED STATES PATENT OFFICE 2,390,486

RECORD PUNCHING MACHINE

Charles R. Doty, Yonkers, N. Y., assignor to International Business Machines Corporation, New York, N. Y., a corporation of New York Application February 15, 1945, Serial No. 578,108

18 Claims. (Cl. 164—113)

This invention relates to typewriter and record punching machines and more particularly to coordinated machines which are commonly controlled by the alphabetic keyboard of a typewriter, and/or an auxiliary digit keyboard, whereby typing of data on a sheet in the typewriter may be effected concomitantly with the punching of data on a record, or punching or typing may be effected independently.

Such form of intercontrolled typewriter-punching machine is fully shown and described in the patent to C. R. Doty, No. 2,318,299, patented May 4, 1943.

The main object of the invention is to incorporate improvements in the type of machine exemplified in the above patent to specifically extend the usefulness of such machine but as will be subsequently evident the present improvements are of a nature that may be incorporated in equivalent forms of machines to correspondingly extend the usefulness of such other machines.

As fully and specifically described in the above designated patent, it is contemplated to punch both alphabetical and numerical data on a single record corresponding to some or all of the typed data on the bill or statement in the typewriter. Ordinarily, for the data which is to be punched on a record, the columns of data existing in a standard tabulating card will fulfill the requirements for punched data and in this respect the majority of the commercial requirements are satisfactorily supplied. At times, however, there is a special requirement for punching more data than can be accommodated on a standard tabulating card. This data, of course, would be punched in fields of another card which are different in that they consist of different fields of punched information and therefore when a card of the first type is completely punched, the program of punching and typing should be changed for this extraneous data punched on the second card.

In the patented machine the plugging connections which determine the columns to be punched on the card, and also the times that the various controls of the card punching machine and typewriter are to be effective for one program are prearranged beforehand so that the punching and typing program is automatically carried out, and is the same unless the plug connections are changed. This is the feature of the patented machine and by the incorporation of the selective plug connections on the plugboard the record punching and typing program is carried without loss of time to the operator, but the program remains the same for a plurality of cards unless the plugging is changed.

Obviously, to fulfill the special requirement of punching a second card to take care of the auxiliary or extraneous information, it would be necessary in the patented machine to replug the plugboard for the second program after typing and punching the first record. Thereafter, upon completing the typing and punching of the card according to a second program, the plugging connections would again have to be changed for the third program. This, of course, is impractical for two different programs and far more so if a third different program of punching and typing is required.

It is, therefore, the main object of the present invention to provide selective means operable at the will of the operator, or even automatically, to select different record punching and typing program means whereby record punching and typing may be carried out according to a selected program.

A still further object of the invention is to place such selective program means under control of keys which not only determine the card punching and typing program but punch a selected column of each card to indicate or designate the program carried out in punching that card.

Another object of the invention is to render the punching and typing program means effective throughout the punching of the related record and to provide interlocking means to prevent a change to any other record punching program until a selected program is completely carried out.

A still further object of the invention is to enable the successive feeding of the records to the record punching machine so that upon completion of the punching of one record according to one program, the operator can then select the next program of punching and typing to be carried out. By arranging such records in the magazine and feeding them automatically, the record which is next to be punched will be in position for such punching without the attention of the operator. The only requirement of the operator in the form of machine devised to punch such type of record is to depress the related program selecting key.

It is emphasized, and it will be more evident as the invention is understood in detail, that while the present invention is shown in connection with a particular type of machine, its embodiment is merely illustrative and should not be considered as restrictive. In a broad sense the application of the invention is universal and may be applied to other forms of machines. In general, the broad object of the invention is to provide means to change the program of recording, either punching or printing, or both, so that various forms of recording may be carried out at the will of the operator. While the recording shown herein consists of punching a tabulating card or record, and typing on a sheet, obviously equivalent forms of recording may also be substituted. Furthermore, the control for recording data consists herein of a keyboard but other equivalent controls may also be utilized, such as other controlling records, etc. There are similar requirements in still other analogous or non-analogous forms of machine. For example, tape punching is required to be carried out according to different programs automatically, or at the will of the operator. Herein the manner of devising the machine to vary such program arrangements and to selectively call them into operation is illustrated in one embodiment of the invention. However, the specific construction shown herein can be varied and embodied in different forms without departing from the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view in front elevation showing the interconnected typewriter and punching machine of the specific form shown in the patent to C. R. Doty, No. 2,318,299. T represents the typewriter; K the auxiliary keyboard and P the punching machine with the attached plugboard. It is pointed out that the keys for selecting and varying the recording program preferably comprise the digit keys 1, 2, 3 of the auxiliary keyboard K.

Fig. 2 is a section view through the typewriter, showing the type bar striking mechanism and the electromagnetic control of the keys for effecting the automatic operation of the type bar actuating mechanism. The section view also shows the platen and usual platen carriage of the typewriter having mounted on the carriage the customary typewriter carriage tabulating mechanism.

Fig. 3 is a plan view of the front portion of the typewriter showing particularly the keyboard arrangement.

Fig. 3a is a detail view of a typewriter stop control mechanism for operating certain contacts employed in the present invention.

Fig. 3b is a detail view of a complete series of tabulating stops utilized in the present invention, showing the manner of arranging the operating projections so that the projections will selectively operate the contacts shown in Fig. 3a.

Figs. 4a and 4b are similar to the wiring diagram of Patent No. 2,318,299 and Fig. 4c shows the changes in the wiring of the machine for the present invention.

Fig. 5 is a longitudinal sectional view of a punching machine of a well known form and shows particularly the punch operating mechanism as well as the column selector for effecting selective operation of the typewriter.

Fig. 7 illustrates a sheet typed under control of both the typewriter and auxiliary keyboards and shows the top lines typed according to the first program selected by the operator.

Fig. 8 is a plan view of a tabulating card of a well known form and is shown perforated according to the first program as the sheet shown in Fig. 7 is typed.

Fig. 9 shows the sheet typed in a line below the typed lines of the sheet of Fig. 7 according to the second program.

Fig. 10 is a representation of the card punched according to the second program as the sheet of Fig. 9 is typed according to the same program.

Figure 1:
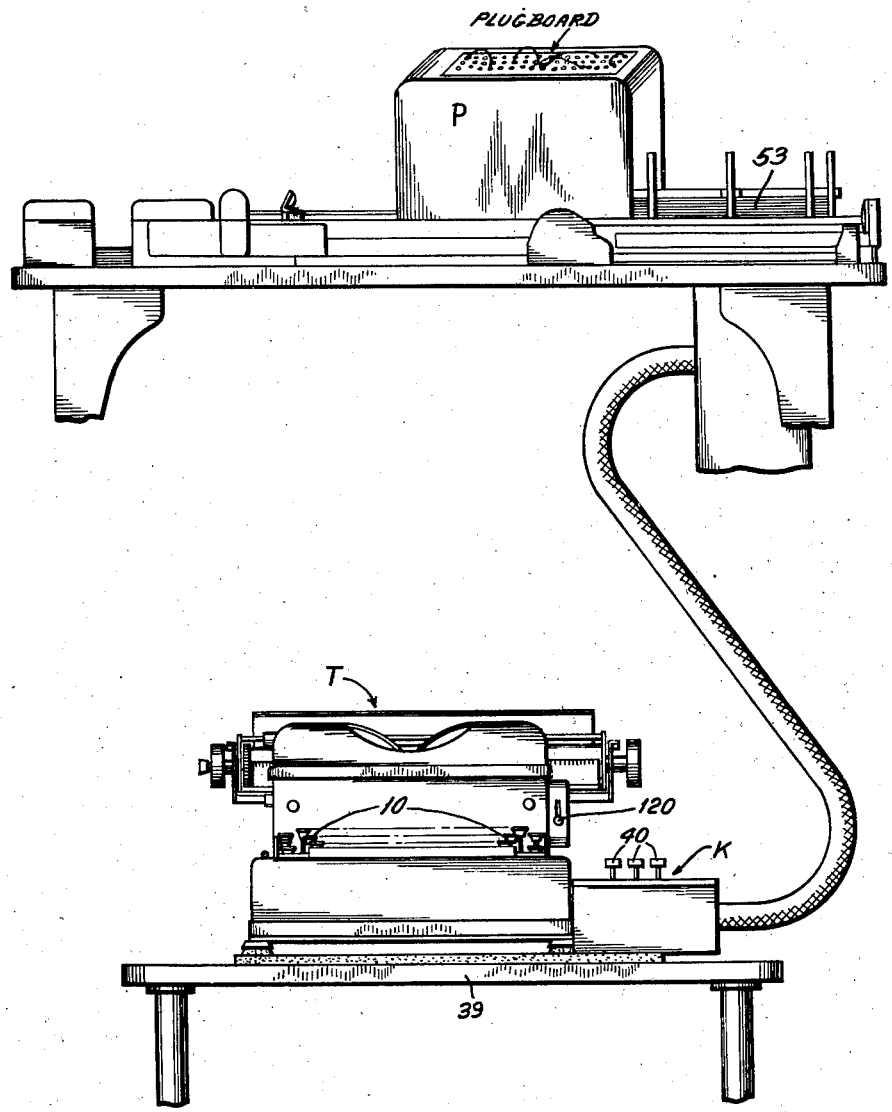

Figs. 11 and 12 respectively show the additional typing on the sheet and the punching of a card according to the third program.

In general, Figs. 7 to 12 inclusive show sequentially how different record punching and typing programs can be effected as the sheet in the typewriter is typed and each card is punched to represent the desired information. The job is completed when the sheet is typed as shown in Fig. 11 and the three cards shown in Figs. 8, 10 and 12 are differently punched to represent all of the desired information.

*The typewriter*

Although applicable to any ordinary typewriter, the invention is preferably shown in connection with a typewriter constructed as shown in Patents Nos. 1,777,055 and 1,873,512, which is now on the market and known commercially as the "Electromatic."

Fig. 3 shows the keyboard of which keys 10 are the alphabetic keys, and other functional keys are also shown, such as Cr for carriage return, Tab, the tabulating key, bar Sp the space bar, special type or punctuation keys for printing a period, dash, comma, diagonal, the latter being principally used in connection with the present invention.

Briefly, referring to Fig. 2 depression of any of the printing keys releases a latch 11 from a cam 12, permitting a spring pressed lever 13 to move the cam 12 against the periphery of a continuously rotating motor driven roller 14. The cam 12 is rotated by contact with the roller 14 causing the carrier 15 of the cam to rock in a direction for depressing a link 16 which, through linkage 17, propels the type bar 18, carried by the basket 19, towards the platen 20 to effect printing from the type denoted by the operated key. During the final increment of the movement of the type bar 18, it strikes a universal bar 22 to actuate the escapement lever 23 for releasing the escapement mechanism to effect a carriage spacing movement. This is the operation which is effected for the printing keys.

Depression of space bar SP similarly results in downward movement of link 16' to operate linkage 24 for actuating the escapement lever 23 to effect a carriage or letter spacing movement.

The carriage return mechanism operated by key CR is of the type disclosed in Patent 1,955,614. As is usual, the carriage return movement is accompanied by a line spacing operation.

The tabulating mechanism operated by the key Tab is such as shown in Patent No. 1,935,436, and includes the usual settable tabular stops 25.

Figure 4A:
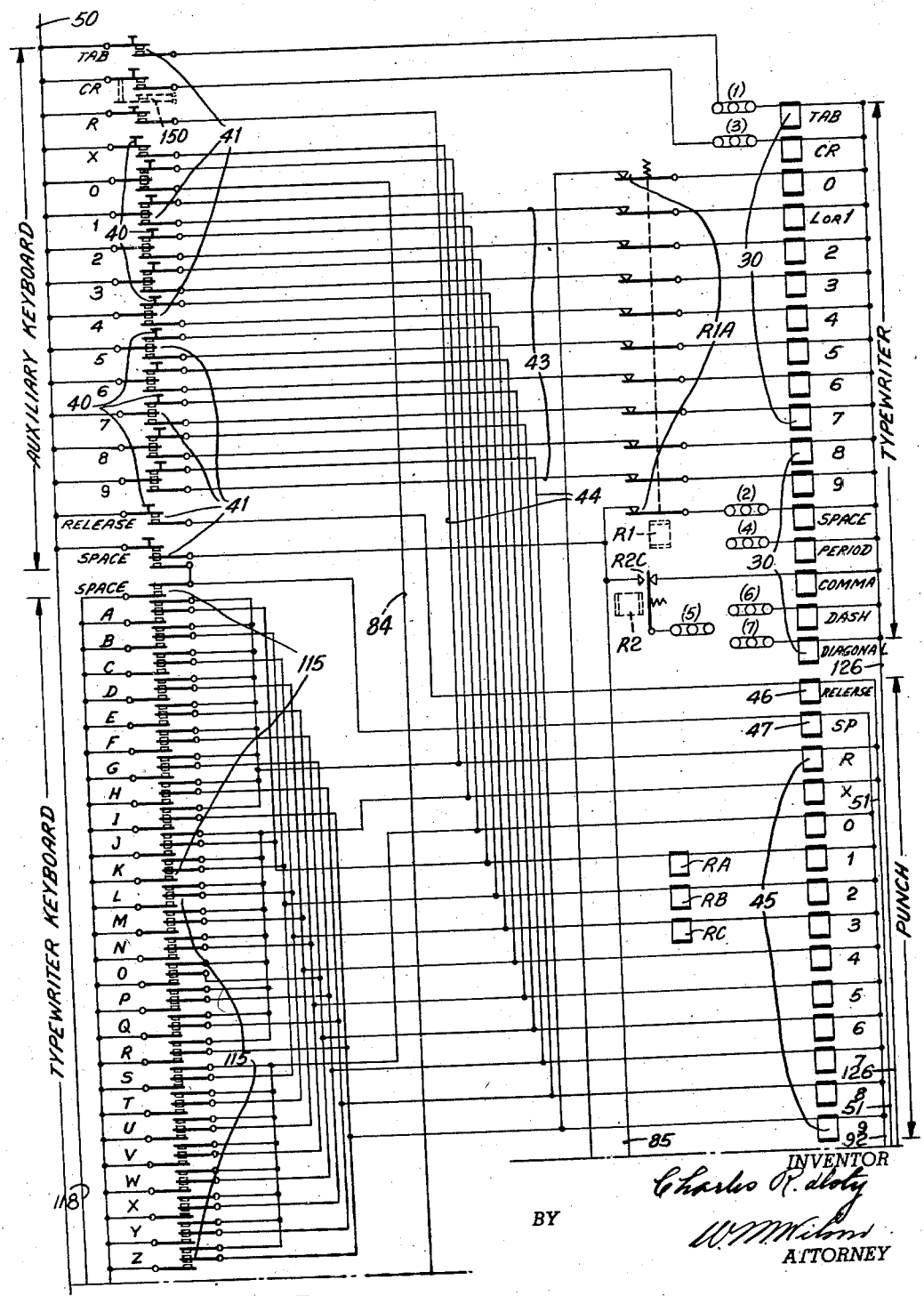
Figs. 4a, 4b and 4c represent a composite wiring diagram of the electrical instrumentalities of the machine when arranged in the named order.

Supplementing the above construction are solenoids 30, one for the various keys to be operated under control of another keyboard or other instrumentalities. Energization of the solenoid 30 results in automatic operation of a key and the mechanism operated by the key whether it is a functional operation in the typewriter, or a printing operation from selected type. Referring to Fig. 4a there will be seen a series of the solenoids 30 and the designation affixed to each solenoid designates the particular key which is operated upon its energization. In general, for the present invention, the functional keys, Space, Tab, Cr, and the type keys, 0–9, period, comma, dash, and diagonal are operated this way.

Also mounted on the slotted rack 31 (Figs. 2 and 3a) which is carried by the carriage of the typewriter, are marginal tabulating stops 32 which are fixed at desired positions on the rack corresponding to positions that certain functions should take place when the carriage reaches such column positions.

The stops 32 are of different shapes and the five used in the present invention have projections 32a, 32b, 32c, 32d, 32e, at different heights as is evident in Fig. 3b. These projections contact and operate related levers 33 (Fig. 3a) at certain column positions of the carriage. For the five tab stops 32 there are related contacts 34, 35, 36, 37, 38 and contacts 34, 35, 36, 38, are opened by the related tab stops 32, as shown in Fig. 3a but contacts 37 (Fig. 4b) are closed by the related lever 33 by an obvious modification.

The typewriter T (Fig. 1) is shown mounted on a table 39 and adjacent the typewriter is a keyboard K, some keys 40 of which are operated to type on an invoice 26 (Figs. 7, 9 and 11) in the typewriter and to punch cards 27 (Figs. 8, 10 and 12) by means of a distantly located punch P (Fig. 1).

The auxiliary keyboard

The keyboard K (Fig. 1) known herein as the auxiliary keyboard may be of any conventional type consisting of exteriorly operated keys 40 to close contacts 41 (Fig. 4a). The keyboard consists of ten digit keys 0–9 inclusive, and special keys Tab, Cr, which energize the solenoids 30 for these keys of the typewriter. Also included in the auxiliary keyboard are keys X and R for causing punching at X and R positions on the card, and keys, Release and Space which effect certain functions in the punching machine, the space key also causing carriage spacing operations in the typewriter.

From Fig. 4a it will be seen that when the lower contacts 41 are closed by the digit keys 1–9, circuits are closed to the similarly designated solenoids 30 by lines 43 provided relay contacts R1A are closed. The relay magnet R1 is normally deenergized so as to concomitantly punch and type under control of the auxiliary keyboard, and is energized when it is desired to punch but not type.

The upper contacts 41 of the keys 1–9 and contacts 41 of X and R keys are connected to lines 44 which, in turn, are connected to the punch magnets 45 having similar designations.

Current for energizing the solenoids 30 or the punch magnets 45 and other relays is afforded by the lines 50, 51 which may be connected to a suitable source supply. It will be seen that the common line connection for solenoids 30 is conncted by a line 126 to normally closed contacts 125 which are connected to the line side 51.

The closure of the contact 41 of the release key effects the energization of the release magnet 46 in the punch, and the space key effects the energization of the space solenoid 30 of the typewriter as well as the space solenoid 47 of the punching machine. Hence, by the depression of these keys in the auxiliary keyboard, spacing functions may be performed in the typewriter and/or punch and a release function in the punch without requiring the operator to depress the corresponding keys in the typewriter or punch.

The circuits controlled by the 0 key 40 which closes both its upper and lower contacts 41 will be subsequently explained.

Card punching machine

The card punching machine used in connection with the present invention is of the type shown in the patent to Fred Lee and George Daly, No. 1,976,618, dated October 9, 1934, and only so much of the operation thereof will be explained as is necessary for an understanding of its operation in connection with the present invention.

Figure 4B:
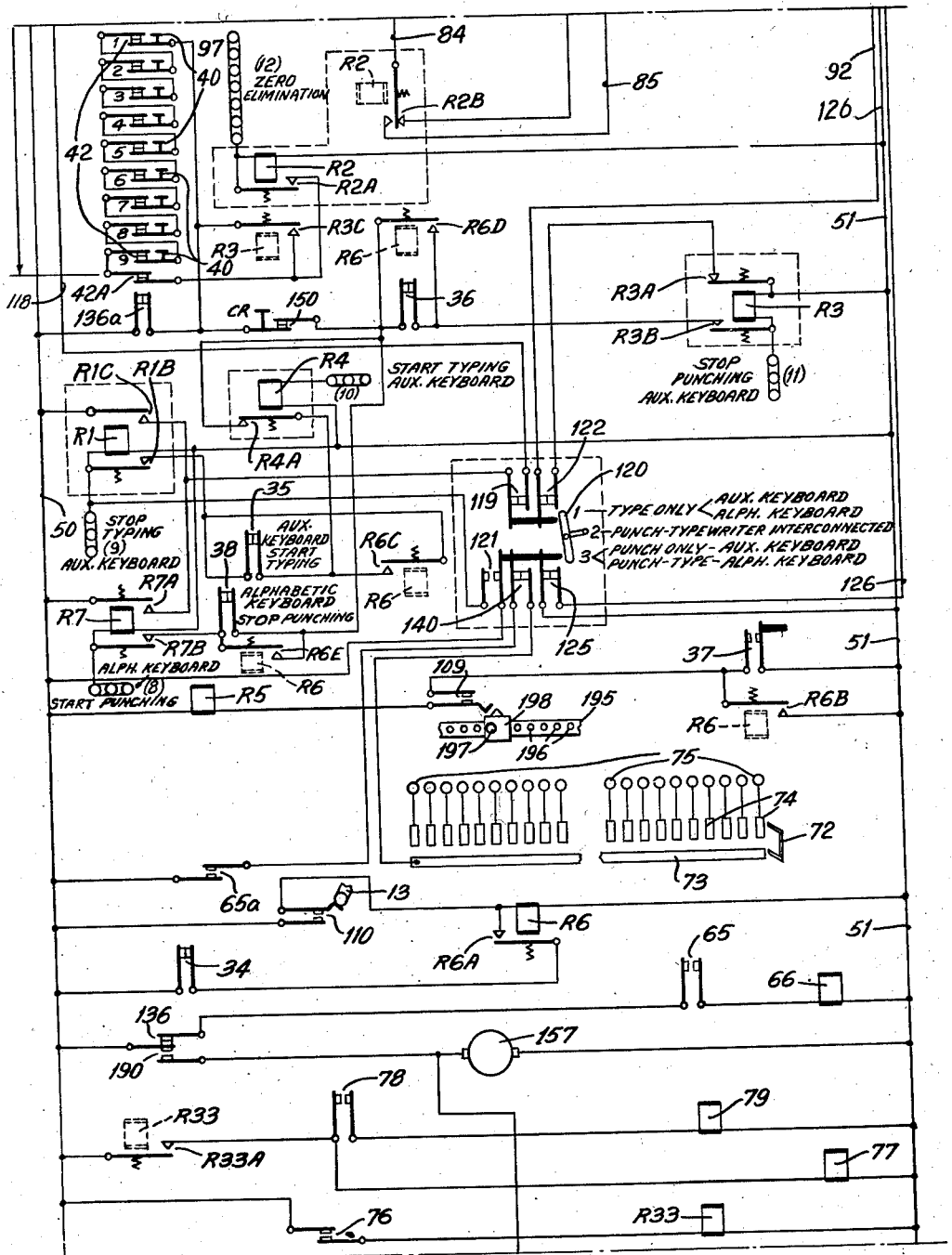

In general, the punching machine contains a feed magazine 53 (Fig. 5) from which the cards are fed singly from the bottom of the magazine as is well known by a picker which feeds the cards to a position under the punches 55 and in the present machine, the carriage escapes in the usual manner to present the twenty-first column of the card to the punches preparatory to receiving the perforations effected by the first manual punching operation. From this position the card is engaged at its rear edge by a pusher 54 mounted upon an escapement rack 56 which, for each operation of the punches, permits the advance of the card step by step. The series of magnets 45 is adapted to select the punches 55 for actuation in the following manner: Associated with each magnet 55 is a pivoted armature 57 whose free end is connected to a rod 58 which, through a bell crank 59, moves an interposer bar 60 to the left in Fig. 5 where it cooperates with a punch bar or plate 61. The forward movement of the interposer bar 60 is adapted to rock a bail 62 pivoted on a rod 63 and which bail is connected to a spring pressed depending link 64 whose lower free end is adapted to engage and close contacts 65. This, as shown in Fig. 4b, closes a circuit from the line 50 through contacts 136 now closed, through contacts 65, through the magnet 66 to the line 51. The energization of the magnet 66 will then attract its armature 67 and through a link and bell crank connection 52 shown in the aforementioned patent will draw downwardly on the pivoted punch bar or plate 61 to force the selected interposer against the associated punch, thus perforating the card. When the armature 67 is attracted by magnet 66, a depending projection of the horizontal link 52 closes contacts 65a and such closure is effected after perforating the card and before the punch carriage spaces to the next column position. Contacts 65a are also shown in Fig. 4b.

The selection of the magnets 45 which are punch selectors for effecting the punching operations is under control of the series of keys 40 which close contacts 41 and as stated, such keys are mounted in an auxiliary keyboard separate from the punch.

As is fully shown in the patent to Lee et al., No. 1,976,618 when the armature 67 reaches the limit of its movement to the right, the link 64 will be moved by a projection 52a to become disengaged from one of the spring blades of contacts 65 to permit such contacts to open, thereby deenergizing the magnet 66 which will then release its armature allowing a spring 68 to rock the plate 61 upwardly and permit the selected interposer 60 to rise and thereafter be restored to normal position by a spring 69.

Escapement mechanism

The escapement mechanism is not shown herein since it is fully shown and described in the Patents No. 1,976,618 and No. 1,426,223. It will suffice to say that when an interposer 60 is depressed it will rock a bail 70 attached to a shaft 71 and the rocking of this shaft will actuate the escapement mechanism to space the card carriage a single column.

Column selector

The column selector for the punching machine illustrated herein is also well known and is shown in the patent to G. F. Daly et al., No. 2,016,706, dated October 8, 1935. As shown in Fig. 1, as well as in Fig. 4b, it consists of a movable contact brush 72 carried by the punch carriage engageable with a reading strip comprising a common contact strip 73 and contact points 74, some of which are connected so as to cause certain functions to be performed when the carriage is at certain column positions, in a manner to be subsequently explained. Contact points 74 are individually connected to plug sockets 75 of a plugboard (see Figs. 4b and 6).

Incidental operations in punch

These operations consist of the closing of contacts 76 (Fig. 4b) which are closed in the last column position of the card carriage and which contacts are the same as contacts 191 in the Patent No. 1,976,618 and closed in the manner described in this patent. The closure of contacts 76 energizes a relay R33 to close contacts R33a, which in turn causes the energization of the card eject control magnet 77, which corresponds to magnet 199 of the aforementioned patent.

As the card is ejected, contacts 78, corresponding to contacts 291 of the aforementioned patent, will complete a circuit extending through relay contacts R33A to magnet 79, which corresponds to magnet 175 of the Lee et al. Patent No. 1,976,618.

Magnet 79 (Fig. 5) will attract its armature 80, and the arm 81 thereof will bear upon an insulating block to open contacts 136, 136a (both shown in Fig. 4b) and close contacts 190 precisely as in the last mentioned patent. Contacts 190 now being closed close a circuit to the motor 157 which is the same motor in the Patent No. 1,976,618 and similarly designated. At the same time, as is well known and explained in Patent No. 1,976,618, arm 81 effects the engagement of the clutch between this motor and the moving mechanism for the card carriage, which automatically feeds a blank card thereon for the next card punching operations and returns the carriage to an initial starting position.

These incidental operations are only explained herein by reference to the wiring connections of the elements involved to effect these incidental operations. These operations, in the form of punching machine selected as an embodiment, are very well known and recourse to the patents referred to for such will give further details of construction and operation.

Plugboard

Included in the arrangement is a plugboard having plug sockets (Fig. 6) to which are wired the different magnet and relay controls and also the contact points 74 (Fig. 5) of the column selector. The selective energization of these different electrical controls under control of the column selector as well as by the carriage of the typewriter determine according to the selected program the typing and punching operations to be effected as the keyboards are operated. Plug sockets 75 marked "Card columns" are wired to the contact points 74 of the column selector so that from various column positions of the punch carriage the controls may be selected for operations which are to be changed to accommodate various forms of cards and typewritten forms. The three programs of operations are plugged up before a job is started.

Figure 6:
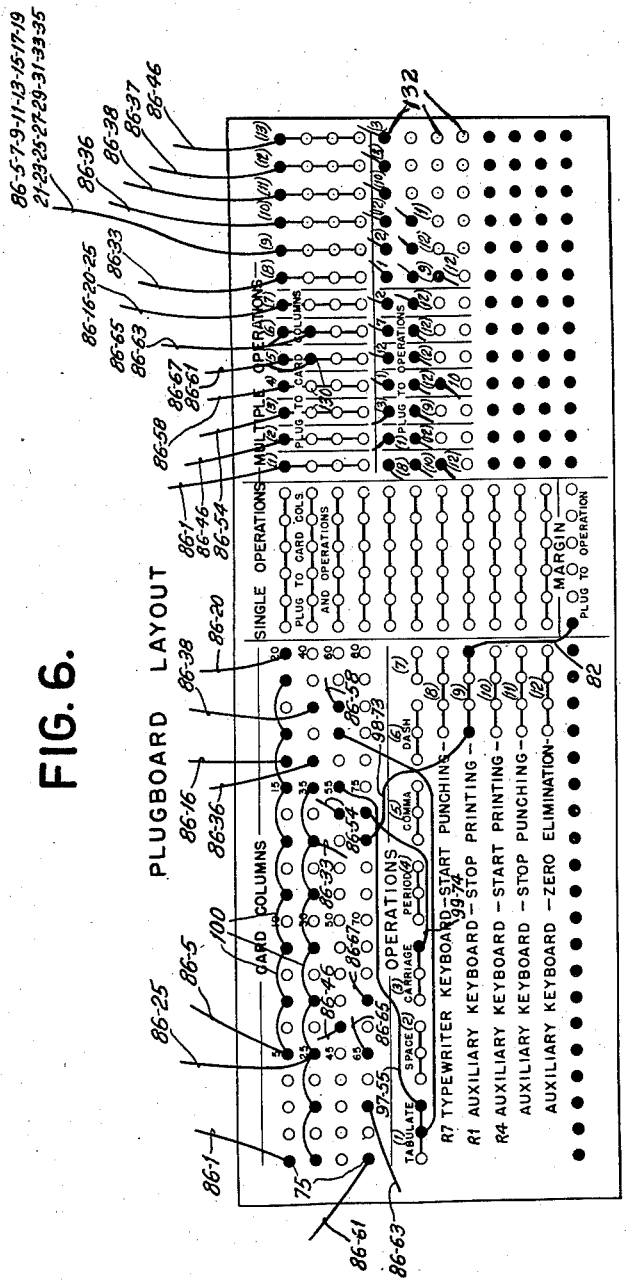
Fig. 6 is a diagram of the plugboard layout shown with the plug connections made for carrying out the record punching and typing program for three different requirements, which programs may be selected at the will of the operator.

The particular purpose and function of this plugboard will be brought out more clearly as an exemplary punching and typing job is explained in detail. The plugboard is shown in Fig. 6 plugged for three different typing and recording programs and it is to be understood that many variations may be made according to the requirements and the example shown is merely one of a great number of different programs that may be carried out. In view of the multitudinous plug connections made for the selected example, the plug wires are not completely shown in Fig. 6, being merely shown with opposite ends correlated with the plug hubs or sockets, the same reference character indicating the beginning and termination of the plug wires. Where a plug connection is made from a card column the card column is designated by the numeral following a hyphen. For example, 86—1 indicates a plug wire related to card column 1.

The various controls are shown in the wiring diagrams as magnets and relays and they terminate at plug sockets which are under "Operations" as shown in Fig. 6. When a plurality of functions are to be performed at card 1 column position of the punch carriage and controlled by a single relay, a plug connection is made from such column position to one of the upper plug sockets of the series designated "Multiple operations" and the electrical instrumentalities involved to effect such multiple results will be subsequently explained.

The machine also includes a margin control circuit, whereby the machine is conditioned for selected operations at the margin position of the typewriter carriage and punch carriage when a plug connection is made to one of the plug sockets designated "Margin" and the selected plug socket of the "Operations" section. The plug connections and the operations effective will be made clearer as the description ensues.

To illustrate the manner of operation of the present invention, recourse is to be had to Figs. 7 to 12, inclusive in which Figs. 7, 9, 11 indicate the sequence of typing the printed sheet and Figs. 8, 10, 12 indicate the manner of card punching of the three separate cards known herein as card 1, card 2 and card 3, all of which are of the same type but are punched differently with respect to card fields.

Margin control circuit

One of the electrical controls fully described in the aforementioned patent to C. R. Doty, No. 2,318,299, is a margin control which is operative at the initial recording position of the punch carriage and typewriter carriage. Contacts 109 (Fig. 4b) provided on the punch are closed at the first column to be recorded. As more fully shown and described in the patent to F. L. Lee et al., No. 1,772,186, the punching machine shown herein is provided with a bar 195 (Fig. 4b) secured to the card carriage and having at column intervals openings 196 into which may be inserted the shank of a set screw 197 threaded in a block 198, adjustable on bar 195. At the column 1 position of the punch in the example herein, a cam projection on block 198 will close contacts 109. The elements 195, 196, 197 and 198 are similarly designated in the last mentioned patent. At the initial start-to-type position of the typewriter carriage, the tab contacts 37 (Fig. 4b) will be closed and in conjunction with the contacts 109 will energize the R5 relay by an obvious circuit.

Designation of type of card and conditioning of the related program means for card 1

As previously intimated, the operator has means under his control for conditioning the machine so that card punching and typing operations initiated by the operator are carried out to a predetermined program. The cards are placed in the supply magazine of the hopper and are successively fed, so that at the beginning of card punching operations a card is in position for punching; and of course, at the beginning of a job the typewriter carriage is at a left hand position for typing on the top line of the sheet. In the present embodiment of the invention, to punch card 1 and to type according to the typed matter of the sheet of Fig. 7, the operator first depresses the 1 key 40 of the auxiliary keyboard (Fig. 4a) which energizes the 1 punch magnet 45 and also the RA relay in series with such punch magnet. Energization of said 1 punch magnet 45 will, in the usual way, perforate card 1 at column 1 position at the 1 index point position (see Fig. 8), this card field being allocated for the designation of type of card. As will appear subsequently the "1" is not typed on the sheet. Energization of the RA relay will close the RA1 contacts and a circuit will now be closed from line 50 through RA1 contacts (Fig. 4c), through one of the R5A contacts, thence to the pickup winding of the RD relay to line 51. The pickup winding closes stick contacts RD1 and a stick circuit for the RD relay extends from the line 51, through the holding winding of the RD relay, through the RD1 contacts, thence through the well known latch contacts 136 of the punching machine, to line 50. Relay D herein is the program conditioning means for causing card 1 to be punched and the top line of the sheet to be typed according to a predetermined program and when once energized is held energized until card 1 has been completely punched and the punched card has been ejected and a blank card positioned on the carriage. Obviously, when either the typewriter carriage leaves the margin position or when the punch operates so as to space the card carriage from column 1, R5 relay will be deenergized, opening the pickup circuit for the RD relay and other relays RE and RF comprising the remainder of the punch-type programming means. Hence, once a predetermined typing and punching program has been instituted by the energization of a RD, RE, RF relay, it will be maintained by a holding circuit through latch contacts 136 and cannot be changed until the card to be punched has been punched and ejected from the machine.

Figure 4C:
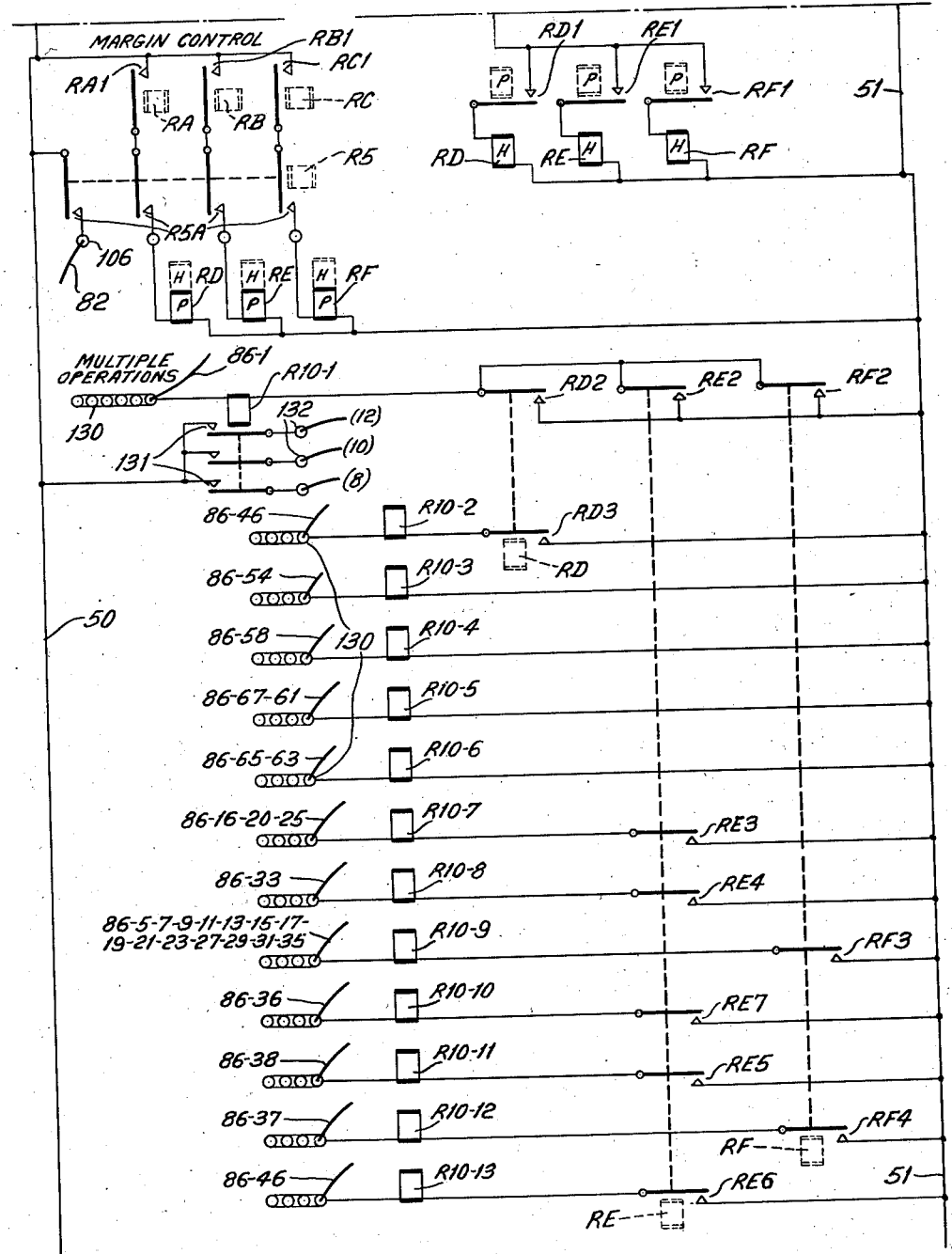

With respect to the R5 relay energized at the margin position, it will be observed from Fig. 4c that a plug socket 106 associated with one of the R5A contacts has a plug connection 82 which, as shown in Fig. 6, terminates at one of the plug sockets (9) for controlling the function of "auxiliary keyboard-stop printing." As fully explained in Patent No. 2,318,299, the elimination of typing on the sheet while enabling punching on a card under control of the auxiliary keyboard is effected by the energization of the R1 relay, so that, through the aforesaid plug connection, the circuit to energize the R1 relay (Fig. 4b) is closed. R1 relay opens its multi-contacts R1A (Fig. 4a), thus disconnecting the typewriter solenoids 30 from contacts closed by the keys of the auxiliary keyboard. Thus, when the 1 column of the card 1 (Fig. 8) is punched, no typing will appear on the sheet of Fig. 7 and the platen carriage will remain in the margin position.

The stick circuit for the aforesaid R1 relay extends through stick contacts R1B (Fig. 4b), the Tab control contacts 35, relay contacts R4A now closed, contacts 150 opened by the carriage return key Cr, through supplemental latch contacts 136a and back to the line 50. As will be subsequently explained, when card 1 has been punched in column 1, the R4 relay will be energized to open contacts R4A to deenergize R1 relay to enable, under control of the auxiliary keyboard, typing to be effected concurrently with card punching operations for the next field of the card consisting of columns 2-46 of card 1.

Multiple operations

When a plurality of functions are to be performed at one column position, it is desirable to employ a relay, such as R10 (Fig. 4c) to effect this, there being thirteen of such relays in the present machine. One side of such relays terminates at the related one of a series of plug sockets 130 so that by a plug connection thereto it may be selected for operation. From Fig. 4c it will be seen that the other side of such R10 1—R10—13 relays is either directly connected to the line side 51 or is in series with contacts controlled by the program determining relays RD, RE and RF. When each R10 relay is energized it closes four pairs of contacts, as shown in Fig. 4 for the first of such relays, designated R10—1. One blade of the contacts 131 is connected to four plug sockets 132, from which plug connections are made to the plug sockets in the section of the plugboard designated "Operations." Plug connections 86, referring to Fig. 6, are made from the plug sockets of the section of the plugboard designated "Card columns" to the related plug socket 130, so that as the column selector of the punch occupies successive card column positions and when the card column is punched, the R10 relays will be successively called into operation, provided that such is required by the program determining relays RD, RE and RF. The complete plug connections 86 from such card column plug sockets to the plug sockets 130 are not shown as stated hereinbefore, but each plug connection 86 is identified by the card column it is associated with. For example, 86—1 indicates a plug connection from card column 1 of the column selector to R10—1 relay. In order to economize on the number of R10 relays used, one of such relays may be utilized more than once for calling in multiple operations at successive card column positions. As an example, plug connections 86—61 and 86—67 come from plug sockets of columns 61 and 67 and terminate in two plug sockets 130 of the fifth relay R10 from the left or R10—5. Thus, according to the plug connections made from the plug sockets 132, the same multiple operations will be effected for two successive card column positions.

As stated hereinbefore, the plug connections from the "Operations" plug hubs to the plug hubs 132 enables selected operations to be performed, dependent upon the plug connections made. For example, when the R10—1 relay is energized upon punching card column 1 position, the related contacts 131 (Fig. 4c) will be closed. From Fig. 6, it will be seen that the plug sockets of the section of the plugboard designated "Operations" are labeled 1, 2, 3, etc., to 12. From the plug sockets 132 the numeral designations in parentheses indicate plug wire connections from such plug sockets 132 to the "Operations" section of the plugboard. Hence, at card column 1 position, the machine will be conditioned for typewriter-keyboard-start punching, auxiliary keyboard-start printing and auxiliary keyboard-zero elimination. The manner in which each operation is effected will be described as such operation is encountered in the sequential operation of the machine.

*Punching card 1*

Having depressed the 1 digit key to punch card column 1 to designate the corresponding type of card, the operator is now ready to punch the next card field consisting of columns 2–46 which is punched with alphabetical information to represent, as shown in Fig. 8, "Washer body hold down bolt." This information is punched on the card and typed in the sheet of Fig. 7 concurrently by the manipulation of the alphabet keyboard 10 of the typewriter (Fig. 1). To this end, the machine is conditioned for securing such result by means of a plug connection 86—1 which causes energization of the R10—1 relay, the circuit extending from the line 51 (Fig. 4c) through the RD2 program contacts now closed, R10—1 relay, plug socket 130, plug connection 86—1 to a plug socket 75 (Fig. 4b), contact point 74, brush 72, common contact strip 73, contacts 140, contacts 65a (see also Fig. 5) closed when each card column is punched, to the line 50.

The 8 plug connection from the socket 132 associated with the R10—1 relay conditions the machine so that punching of the card columns is effected while the typewriter keyboard is operated. The means for effecting such result is fully described in the aforementioned Patent No. 2,318,299 but will be briefly described herein to understand the mode of operation of the machine. In brief, the aforementioned plug connection 8 causes the energization of the R7 relay (Fig. 4b), a stick circuit being provided through R7B and Tab stop contacts 38 to maintain such relay energized until a subsequent time. The R7 relay causes the closure of the R7A contacts and closure of such contacts enables the punching of alphabetic data according to the punch code shown in page 10 of Patent No. 2,318,299. Hence, in conformity with this code, columns 2–46, inclusive are punched to represent alphabetic information. When the field of alphabetic punching has been completed Tab stop 38 opens to open the stick circuit of R7 relay.

While not exemplified in the present example, it is desirable at times to punch in the card field under consideration digit information by the manipulation of the auxiliary keyboard. Provision is made for securing this result by means of the plug connection 10 associated with R10—1 relay which will enable punching of such digit information and also the energization of solenoids 30 of the typewriter to type this information. The instrumentality for securing this result consists of the R4 relay (Fig. 4b), which opens contacts R4A to deenergize the previous energized R1 relay. The manner in which the R1 relay was previously energized at the margin position was previously explained. The energization of the R1 relay then closes the R1A contacts (Fig. 4a), thereby effecting a direct circuit connection between the contacts closed by keys 41 of the auxiliary keyboard and the solenoids 30 of the typewriter. Hence, typing is effected concomitantly with punching of digit information in card 1 for the second car field when desired.

A feature of Patent No. 2,318,299 consists in elimination of typing of zeros to the left when typing is to be performed under control of the auxiliary keyboard while enabling such zeros to be punched on the card and is used herein for all digit punched fields. Such zero elimination is fully described in the aforementioned patent and is controlled by the R2 relay with associated holding circuit. The plug connection 12 causes the energization of such R2 control relay (Fig. 4b) and thus conditions the machine for zero typing elimination. This, of course, is used in connection with the auxiliary keyboard and is operated to effect concurrent typing and punching of digits. When a significant digit 1–9 is typed, the holding circuit for R2 relay is broken, requiring the R2 relay to again be energized for zero elimination in connection with the next card field.

Since herein all of the alphabetic data does not utilize all of the card columns 2–38, the Tab key of the auxiliary keyboard is operated to tabulate the typewriter carriage to a printing position determined by the Tab stop #2 (see Fig. 7). A Skip key of the auxiliary keyboard (not shown) wired to energize skip magnet 56 of Patent No. 2,315,741 is also operated to skip the card carriage of the punching machine to column 38. Such keys are adjacently mounted on the auxiliary keyboard and can be concurrently operated by a single manual stroke.

The auxiliary keyboard is now operated to punch card columns 38–46 to represent the number 123456789, which is also typed on the sheet at a location determined by Tab stop #2. When column 46 is punched the column selector through the plug connection 86—46 (Fig. 6) will cause the energization of the R10—2 relay to again condition the machine for the zero elimination operation just described and to also tabulate the typewriter carriage to bring the sheet on the typewriter to a position determined by Tab stop #3 (Fig. 7) so that the next item of information 12345678 may be typed at the desired place.

The plug connection 12 (Fig. 6) associated with the R10—2 relay will energize the R2 relay to condition the machine for zero typing elimination for the next card field. From Fig. 4c it will be observed that the circuit for energizing the R10—2 relay extends through the RD3 program contacts and the previous closure of such contacts establishes this recording program for card 1 when card column 46 is punched.

Thereafter the auxiliary keyboard is operated to cause the typing of the "Part number"—12345678—and also to concomitantly punch card columns 47 to 54 to represent the same number. This is so because the R1 relay (Fig. 4a) is still deenergized and the typewriter solenoids 30 are selectively energized under control of the keys 40 of the auxiliary keyboard, and the punch control magnets 45 are also energized.

When column 54 is punched, the plug connection 86—54 (Fig. 6) causes the energization of the R10—3 relay and the associated plug connections 3 and 9 cause a carriage return operation and also condition the machine so that when the auxiliary keyboard is subsequently operated, typing will not be effected. The energizing circuit for the R10—3 relay is not established through any program determining contacts since only card 1 is punched at column 54, as will appear later. This statement is also true of relays R10—4, R10—5, R10—6, used subsequently for card 1.

The plug connection 3 to one of the "Carriage" plug sockets (Fig. 6) causes the energization of the CR solenoid 30 (Fig. 4a). This, as is well known, in the type of typewriter shown herein, causes the return of the platen carriage to the left hand margin and is held in such position. Currently, with such carriage return the platen line spacing mechanism is operated so that subsequent typing will be made on the second line below.

The other plug connection 9 effects the energization of the R1 relay which opens its R1A contacts, such circuit for the R1 relay having been previously described and in more detail in the aforementioned Patent No. 2,318,299. The opening of the R1A contacts disconnects the typewriter solenoids 30 from the contacts operated by the auxiliary keyboard. Thus, when the next field consisting of columns 55–58 or "Seq No" is punched to represent the number 1234, the typing of such digits cannot be effected on the sheet in the typewriter.

When card column 55 is punched, through a plug connection 97—55 (Fig. 6) from column 55 to the 1 plug socket, the solenoid 30 designated "Tab" (Fig. 4a) is energized, thus tabulating the platen carriage of the typewriter from the margin to a preliminary position determined by Tab stop #1 (see Fig. 7).

When column 58 is punched, the machine is then conditioned for three operations, namely, the resumption of typing when the auxiliary keyboard is operated to punch columns 59, 60 and 61, the conditioning of the machine for a zero suppression or elimination, and a further tabulating of the platen carriage to a position determined by Tab stop #2 (see Fig. 7). This is effected by the plug connection 86—58 which causes the R10—4 relay to be energized. The plug connections 1, 12, 10, associated with the R10—4 relay condition the machine for the operations just described.

The operator then operates the keys of the auxiliary keyboard to type the group number 123 on the sheet as shown in Fig. 7 and to also punch card columns 59, 60 and 61.

When column 61 is punched, by the plug connection 86—61, R10—5 relay is energized. By the plug connection 12 the machine is conditioned for zero elimination operations for the next card field comprising columns 62, 63, in which columns the number of the month (04) is punched. Also, by the plug connection 2 the solenoid 30 designated "Space" (Fig. 4a) is energized which results in spacing the typewriter carriage, which accounts for the space shown in the sheet in Fig. 7 after the digit 3 in the group number 123. In punching card columns 62, 63, it will be observed that column 62 is punched to represent a 0, whereas, due to the zero elimination control, this does not occur to the left of the digit 4 typed to represent the number of the month. However, a spacing operation occurs instead. When column 63 is punched, by means of the plug connection 86—63 the R10—6 relay is energized and by the associated plug connection 12 the zero elimination control is set up for the next card field, consisting of columns 64 and 65. It should also be noted that, due to the associated plug connection 7, the solenoid 30 designated "Diagonal" (Fig. 4a) is energized which results in automatic typing of the diagonal sign after the digit 4 in the date line (see Fig. 7). The auxiliary keyboard is then operated to punch the day of the month, wherein columns 64 and 65 are punched to represent 05 but in the sheet of Fig. 7 the zero typing is suppressed and a space substituted therefor so that only the 5 is typed. When column 65 is punched, plug connection 86—65 causes the R10—6 relay to be again energized, resulting, as just described, in the automatic typing of the diagonal and conditioning the machine for zero suppression for columns 66 and 67. The auxiliary keyboard is now operated for punching such card columns to represent the year (44) and the number 44 is also typed in the sheet of Fig. 7.

When column 67 is punched, through the plug connection 86—67, the R10—5 relay is again energized, resulting in the automatic spacing of the typewriter carriage and conditioning the machine for zero elimination operations for the next card field. This automatic spacing of the typewriter carriage occurs to provide the space between the second digit 4 of the year number 44 and the first digit 1 of the following number 123456. The apparatus is now conditioned for zero suppression in typing the Release No. 123456 and punching is effected on the card concurrently in columns 68 to 73, inclusive.

At column 73 a plug connection 98—73 directly to one of the 9 plug sockets now conditions the machine when column 73 is punched for elimination of printing or typing when the 1 digit key of the auxiliary keyboard is operated to punch column 74 to represent the 1 type of card. Since card 1 is now being punched, the operator depresses the corresponding digit key of the auxiliary keyboard, punching column 74 as shown in Fig. 8 at the 1 index point position, without, however, typing this digit on the sheet of Fig. 7. When card column 74 is punched, by means of a plug connection 99—74 (Fig. 6) directly to one of the 3 plug sockets, the carriage return CR solenoid is operated and the typewriter carriage is power-returned to the left to the margin position. However, in connection with the punch after column 74 has been punched, the operator then depresses the release key of the auxiliary keyboard and the punch card carriage skips in the usual manner to the last column position and as is well known causes the ejection of the punched card, feeding a new card to the bed plate of the card carriage and returning the card carriage to initial position or column 1 herein. The opening of contacts 136 (Fig. 4b) breaks the holding circuit of the program determining relay RD and the machine may now be conditioned for the second card punching and typing program.

*Punching card 2*

With a blank card now in the carriage of the punch, the second card 2 (Fig. 10) is punched in different fields and the third line of the sheet is typed as shown in Fig. 9 and according to the second program. The typing and punching program for such recording will be generally described since many of the individual operations are repetitions of those previously described in detail for card 1. However, it should be understood that the sheet in the typewriter is retained in position about the platen so that when the carriage was previously returned the automatic line spacing operation of the typewriter shown brought the sheet in such position that the first data, or alphabetic recording of the type of material, "Steel" can be effected on the third line of the sheet. However, when the typewriter carriage returns to margin position, the machine is conditioned by the margin control previously described to prevent typing under control of the auxiliary keyboard when the 2 digit of the keyboard is operated to punch 2 in column 1 of the card 2, shown in Fig. 10.

When the 2 punch magnet 45 is energized, the RB relay (Fig. 4b) in series therewith is also energized. The RB relay closes the RB1 contacts (Fig. 4c) and a circuit is closed from line 50 through RB1 contacts, related R5A contacts now closed, pickup winding of the RE relay to line 51. Said pickup winding closes the RE1 holding contacts, thereby energizing the holding winding of the RE relay, the holding circuit for such winding extending through the latch contacts 136 as previously described. The RE relay now closes its multi-contacts RE2, RE3, etc., which are part of the punch and typing program determining means.

The closure of RE2 contacts causes the energization of the R10—1 relay since the punch carriage is at column 1 position and accordingly the machine is conditioned or set up for (1) zero suppression; (2) typing operations when the auxiliary keyboard is operated; and (3) punching operations when the typewriter keyboard is operated. The machine is conditioned as just described when card column 1 of card 2 is punched. Thereafter, in the present example the typewriter keyboard is operated to punch and type to represent "Steel" in the second card field consisting of columns 2-12. In the event that the data does not occupy all card columns of this field the skip key of the auxiliary keyboard is operated to skip the punch carriage to column 13 position. The operator also operates the Tab key of the auxiliary keyboard to tabulate the typewriter carriage to the #2 Tab stop. The auxiliary keyboard is now operated to punch columns 13-16 to represent the number 1234. Since the machine has been previously conditioned for typing under control of the auxiliary keyboard, this same number is typed as the first number 1234 in line 3 of the sheet of Fig. 9.

When column 16 is punched, the column selector of the punching machine through plug connection 86—16 effects energization of the R10—7 relay, it being noted that from Fig. 4c the energizing circuit is through the RE3 program contacts which are now closed. The R10—7 relay through the associated 2 and 12 plug connections (Fig. 6) effects a spacing of the typewriter carriage and also conditions the machine for zero suppression for the next card field, consisting of columns 17 to 20. Under control of the auxiliary keyboard the digit keys are depressed to punch such card columns to represent the second number 1234, which number is also typed as the second number 1234 in line 3 of the sheet of Fig. 9. When column 20 is punched, plug connection 86—20 again energizes the R10—7 relay, again conditioning the machine for zero suppression for the next field comprising columns 21-25 and an automatic typewriter carriage spacing operation. The auxiliary keyboard is then operated to punch card columns 21-25 to designate the number 12345 which is also typed on line 3 of the sheet of Fig. 9. When card column 25 is punched the R10—7 relay through the plug connection 86—25 is again energized to condition the machine for zero suppression and to effect an automatic typewriter carriage spacing operation.

The above illustrates a situation where a relay is commonly used at three different column positions to condition the machine to secure the same functions at each column position. This is clear because the R10—7 relay is rendered effective at three different column positions 16, 20 and 25 to condition the machine to secure two functions in punching card 2 at said column positions.

Having punched column 25 of card 2 the operator, in the present example, then operates the typewriter keyboard to type SERV REF in line 3 of the sheet shown in Fig. 9. Since the holding circuit for the R7 relay is still maintained and its R7A contacts are still closed, the typewriter keyboard is still connected to the punching instrumentalities and according to the alphabetic code columns 26-33 are punched to represent the same alphabetic data.

When column 33 is punched it will be noted that due to the previous closure of the program contacts RE4 (Fig. 4c) and the plug connection 86—33, the R10—8 relay is energized. Such relay has associated plug connections 1, 9, 12. The plug connection 1 effects the energization of the TAB solenoid 30 to tabulate the typewriter carriage to a position determined by a TAB stop #2. At this time, the typewriter carriage will be tabulated to a position corresponding to "1" of the Group No. 123 (see Fig. 9). The plug connection 12, it will be recalled, sets the machine up for zero elimination, whereas the plug connection 9 causes the energization of the R1 relay which now disconnects the typewriter solenoids 30 from the auxiliary keyboard. The auxiliary keyboard is now operated to punch columns 34-37 of card 2 to represent in the field designated "Vendor" the number 1234. Of course, such number is not typed in the sheet of Fig. 9. When column 36 is punched, R10—12 relay is energized, it being noted from Fig. 4c that the circuit for energizing such relay is through the RF4 program contacts and the plug connection 86—36 (see Fig. 6). Associated with the R10—10 relay are plug connections 12 for effecting a zero elimination condition and 1 to effect a tabulation of the typewriter carriage. The typewriter carriage will now be tabulated from the last mentioned position to a position determined by the TAB stop #3 so that the next number 12345678 will now be typed in line 3 on the sheet at the location shown in Fig. 9.

In the present example, column 38 is allocated to represent a field designated PC (purchase condition) which is punched at the 5 index point position by the depression of the related key of the auxiliary keyboard, such digit, however, not being typed on the sheet of Fig. 9. When column 38 is punched, by reason of the previous closure of the program contacts RE5 and the plug connection 86—38 the R10—11 relay is energized and associated with the latter is a single plug connection 10 which causes R4 relay to be energized at such column position. The R4 relay is the instrumentality for deenergizing the R1 relay now reconnecting the auxiliary keyboard with the typing control solenoids 30. The auxiliary keyboard is now operated to punch columns 39–46 of the card of Fig. 10 to represent the number 12345678 which is also typed on line 3 of the sheet of Fig. 9. When column 46 is punched, it will be noted that by reason of the plug connection 86—46 and the previous closure of the program contacts RE6, the R10—13 relay is energized and associated with such relay is a single plug connection 3 which energizes the CR solenoid 30 (Fig. 4a) and thus returns the typewriter carriage to margin position. At column 46 the punch carriage is skipped to the last column position when the release key is operated, resulting in the well known manner, the ejection of the punched card 2 and the feeding of a new blank card to the punch carriage. The operator is now ready to commence the punching of card 3 according to a different program and also to type the sheet on the following line, as shown in Fig. 11. The opening of latch contacts 136 breaks the holding circuit for the previously energized RE program relay.

*Punching card 3*

To set up a program for punching card 3 the operator depresses the 3-digit key of the auxiliary keyboard, perforating card column 1 of card 3 at the 3 index point position. Depression of such key sets the program for punching card 3 and typing line 4 or bottom typed line of the sheet in the typewriter according to the program shown in Fig. 11. With the energization of the 3 punching solenoid 45 (Fig. 4a), the RC relay is energized which, from Fig. 4c, closes the RC1 contacts and through the R5A contacts now closed the pickup winding of the RF program relay is energized. The pickup winding closes the RF1 contacts to energize the holding winding of the RF relay, the stick circuit for the latter being through the latch contacts 136. RF relay now being energized closes its respective program contacts RF2, RF3 and RF4. RF2 contacts effect the energization of the R10—1 relay to condition the machine in the manner previously described for zero suppression, start printing when the auxiliary keyboard is operated, and start punching when the typewriter keyboard is operated.

The next card field punched consists of columns 2, 3, 4 and 5 which is punched in card 3 in the present example to represent P12 (Fig. 12). This requires the operation of the alphabet typewriter keyboard to punch the designation P in card column 2, according to the alphabetic code, and to type the character P in the sheet of Fig. 11. Thereafter, the auxiliary keyboard is operated to punch columns 3 and 4 to represent the numeral 12 which is also typed in the sheet of Fig. 11.

In the present example the operator utilizes the auxiliary keyboard to punch the card to represent a series of 12's, and also type such number in designated columns of the sheet of Fig. 11. In the card sixteen successive card fields are utilized to receive such punched number, each card field consisting of two columns. In punching card column 5 and each second column of the following fifteen card fields, the machine is conditioned for automatic typewriter carriage spacing operations and zero suppression. To this end, card columns 5, 7, 9, 11, 13, 15, 17, 19, 21, 23, 25, 27, 29, 31, 33 and 35 are interconnected by plug connections 100 (Fig. 6) and from card column 5 there is a plug connection 86–5 to the plug socket associated with the R10—9 relay, said relay being energized through the RF3 program contacts. The R10—9 relay has associated therewith plug connections 2 and 12 to condition the machine for automatic platen carriage spacing operations and zero suppression. Of course, where certain card columns are not to be punched to represent any numeral the space key of the auxiliary keyboard is operated to energize, by the circuits shown in Fig. 4a, the space solenoid 30 of the typewriter and the space solenoid 47 of the punch to concomitantly space the typewriter carriage and the punch carriage.

Upon punching card column 37 of the last field of card 3 by means of a plug connection 86—37, and contacts RF4 now closed, R10—12 relay is energized and the latter has associated therewith a plug connection 3 which energizes the carriage return solenoid CR, thereby returning the typewriter carriage back to margin position. From such card column position 37 the usual skipping mechanism of the punch is now operative when the release key of the auxiliary keyboard is depressed to skip the punch carriage to the last column position, following which the punch card 3 is ejected and a subsequent blank card is placed upon the punch carriage. Opening of latch contacts 135 deenergizes the RF relay. The sheet just typed is removed from the platen of the typewriter and a new sheet inserted therein and the operator is now ready to type a new sheet in the typewriter and to punch three cards according to a repetition of the three different programs outlined, the program of typing and the punching operations being selected by the operator, in the manner previously described.

Of course, repetitions of the same recording program can be effected for additional lines of the sheet of Fig. 11 by the repeated depression of the 3-program selecting key, thus making several cards of the 3 type, and as a matter of fact the operator has means under his control to select or repeat any predetermined program of recording operations.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus of the class described, comprising a plurality of recording machines, keyboard means to commonly control said machines to effect concurrent recording by both machines or separate recording by each machine, and a plurality of selectable recording program determining means, one for each different program, for establishing a plurality of different preselected recording programs involving concurrent recording by both machines, or separate recording by either machine to be carried out by said recording machines as said keyboard means is manipulated.

2. An apparatus of the class described, comprising a typewriter machine, a record punching machine, keyboard means to commonly control said machines to effect concurrent typing of a sheet and punching a record, or separate typing and record punching, and a plurality of selectable recording program determining means, one for each different program, for establishing different recording programs involving concurrent typing or punching, or separate typing or record punching by either machine for typing and record punching as said keyboard means is operated.

3. An apparatus of the class described, comprising a plurality of recording machines for differently recording on sheets therein a keyboard apart from said typewriter keyboard to control said machines to effect recording by both machines, or independent recording by each machine, and a plurality of selectable recording program determining means for establishing different recording programs for the sheets in said machines as said keyboard is manipulated.

4. In a recording system of the class described, the combination of a typewriter having an alphabet keyboard and digit keyboard, a record punching machine, an auxiliary digit keyboard apart from the digit keyboard of the typewriter, means controlled by said alphabet keyboard to effect alphabet typing and to concurrently punch a record to represent said alphabetic data, means controlled by said auxiliary keyboard to effect digit typing by said typewriter and to concurrently punch a record to represent digit data, and a plurality of selectable recording program determining means associated with the two preceding means for establishing a plurality of predetermined typing and record punching programs to be carried out as said alphabet and auxiliary keyboards are operated.

5. In a recording system of the class described, the combination of a typewriter having an alphabet keyboard and digit keyboard, a record punching machine, an auxiliary digit keyboard apart from the digit keyboard of the typewriter, means controlled by said alphabet keyboard to effect alphabet typing and to concurrently punch a record to represent said alphabetic data, means controlled by said auxiliary keyboard to effect digit typing by said typewriter and to concurrently punch a record to represent digit data, control means to enable independent alphabet typing, digit typing or digit record punching, and a plurality of selectable recording program determining means associated with the two preceding means and said control means for establishing a plurality of predetermined alphabet, digit typing and record punching programs to be carried out as said alphabet and auxiliary keyboards are operated.

6. An apparatus of the class described, comprising a typewriter machine, a record punching machine, a keyboard to commonly control said machines to effect concurrent typing of a sheet and punching a record, or independent typing and record punching, a plurality of recording program determining means associated with both of such machines for establishing different recording programs for typing and record punching, selective means operable prior to punching a card for selecting one of such program determining means for operation to establish a desired typing program and record punching program, and means to prevent selection of any other program determining means once one of such program determining means has been selected for operation.

7. An apparatus of the class described, comprising a typewriter machine, a record punching machine, a keyboard to commonly control said machines to effect concurrent typing of a sheet and punching a record, or independent typing and record punching, a plurality of recording program determining means associated with both of such machines for establishing different recording programs for typing and record punching, selective means operable prior to punching a record for selecting one of such program recording determining means for operation to establish a desired typing program and record punching program, means for maintaining the selected program recording determining means operable while the selected record punching and typing program is being carried out, and means operable when the predetermined recording program is completed for releasing the selected program recording determining means.

8. An apparatus of the class described, comprising a typewriter machine, a record punching machine, keyboard means apart from the keyboard of either the typewriter or record punching machine to commonly control said machines to effect concurrent typing of a sheet and punching a record, or separate typing and record punching, a plurality of recording program determining means associated with both of such machines, one for each different program, for establishing different recording programs for typing and record punching, and selective means for selecting one of such program determining means for operation to establish a desired separate typing program, or a separate record punching program, or concurrent typing-punching program as said keyboard means is operated.

9. In an apparatus of the class described, the combination of a recording machine, a keyboard to control the successive recording operation of said recording machine, a plurality of control means, one to initiate recording for one zone and the other to suppress recording for another zone, means operable by said keyboard to render said control means effective at different recording zones, and a plurality of selectable program determining means associated with said last named means for varying the zones to be recorded or unrecorded to provide a plurality of different recording programs.

10. In a recording apparatus of the class described, a plurality of recording machines A and B, means to commonly control said A and B recording machines to effect character recording operations at desired zones of the records in each machine, control means initiated by the A machine to suppress recording for a plurality of zones of the sheet in said machine while said B machine effects recording, means controlled by the B machine and effective while it effects recording to subsequently initiate recording for the A machine after each suppression of recording, and a plurality of selectable program means associated with the first named control means for selecting and varying the particular zones in which character recording is to be suppressed and effected by each recording machine.

11. In a recording apparatus of the class described, a plurality of recording machines A and B, means to commonly control said A and B recording machines to effect character recording operations at desired zones of the records in each machine, control means rendered effective by the A and B machines for delimiting the zones of recording for the A machine, other control means rendered effective by the A machine for delimiting the zones of recording for the B machine, a plurality of program determining means associated with the aforesaid control means, and selective means for selecting a program determining means which establishes the desired and predetermined program of recording for the A and B machines.

12. In a recording apparatus of the class described, a plurality of recording machines A and B, means to commonly control said A and B recording machines to effect character recording operation at desired zones of the records in each machine, control means initiated by the A machine for suppressing recording operations thereof, means initiated by the B machine and effective while it effects recording to subsequently initiate recording operations of the A machine, control means initiated by the A machine to suppress recording operations of the B machine and to subsequently initiate recording operations of the B machine, and a plurality of selectable program determining means associated with the aforesaid control means for selecting the particular zones in which character recording is to be suppressed for either the A or B machine.

13. In a selective card punching and typing system, the combination of a typewriter machine, a record punching machine, keyboard means to commonly control joint or individual recording by both of said machines, means for setting up prior to the recording operation controls for carrying out a plurality of different typing and record punching programs, and keyboard controlled selective means for rendering selected controls effective to carry out the predetermined typing and record punching program.

14. In a card punching and typing system, the combination of a typewriter machine, a record punching machine, a keyboard to control joint or individual recording by both of said machines, means comprising a plugboard including prearranged plugging connections for establishing a number of typing and record punching programs, and selective means for rendering a group of selected plugging connections effective to carry out the predetermined typing and record punching program.

15. In an apparatus of the class described, the combination of a record punching machine, a keyboard to control said record punching machine to determine record punching operations, a plurality of control means associated with said record punching machine to effect certain useful functions thereof which determine the program of punching of record columns, a plurality of selective connections made prior to an operation of the machine for calling said control means into operation at different record columns for different records, and selective program determining means for rendering selected connections effective to effect for each record to be punched a different punching program.

16. The combination of a device having individual means, each associated with the card column of a punched card, a plurality of control means, each selectively operable to effect some function determining a recording program, a plurality of normally incomplete plugging connections, each between the individual means of a selected card column and a selected control means, a plurality of relays, each having contacts for completing when the related relay is energized circuits through a related group of plugging connections to the associated control means to perform a plurality of selected functions for carrying out a predetermined recording program for certain card columns, and means for selectively energizing said relays.

17. In a machine of the class described, the combination of a keyboard, a record punching machine controlled by said keyboard, means for inhibiting record punching operations by the keyboard operations, column selector means for initiating the operation of said means at selected columns of the record including normally incomplete selective connections between said inhibiting means and the column selector means for selecting the record columns at which said inhibiting means are operable, and program means for completing related incomplete selective connections for the desired columns that record punching operations are to be inhibited.

18. The combination of a device having individual means, each associated with the card columns of punched card, a plurality of control means, each selectable to perform some function incidental to a card column, a plurality of plugging connections, each in a normally open circuit between the individual means of a selected card column and a selected control means, and a plurality of relay contact means for completing when the related relay is energized the circuits through a related group of plugging connections to associated control means to perform a plurality of functions incidental to selected card columns.

CHARLES R. DOTY.